Patented Apr. 3, 1928.

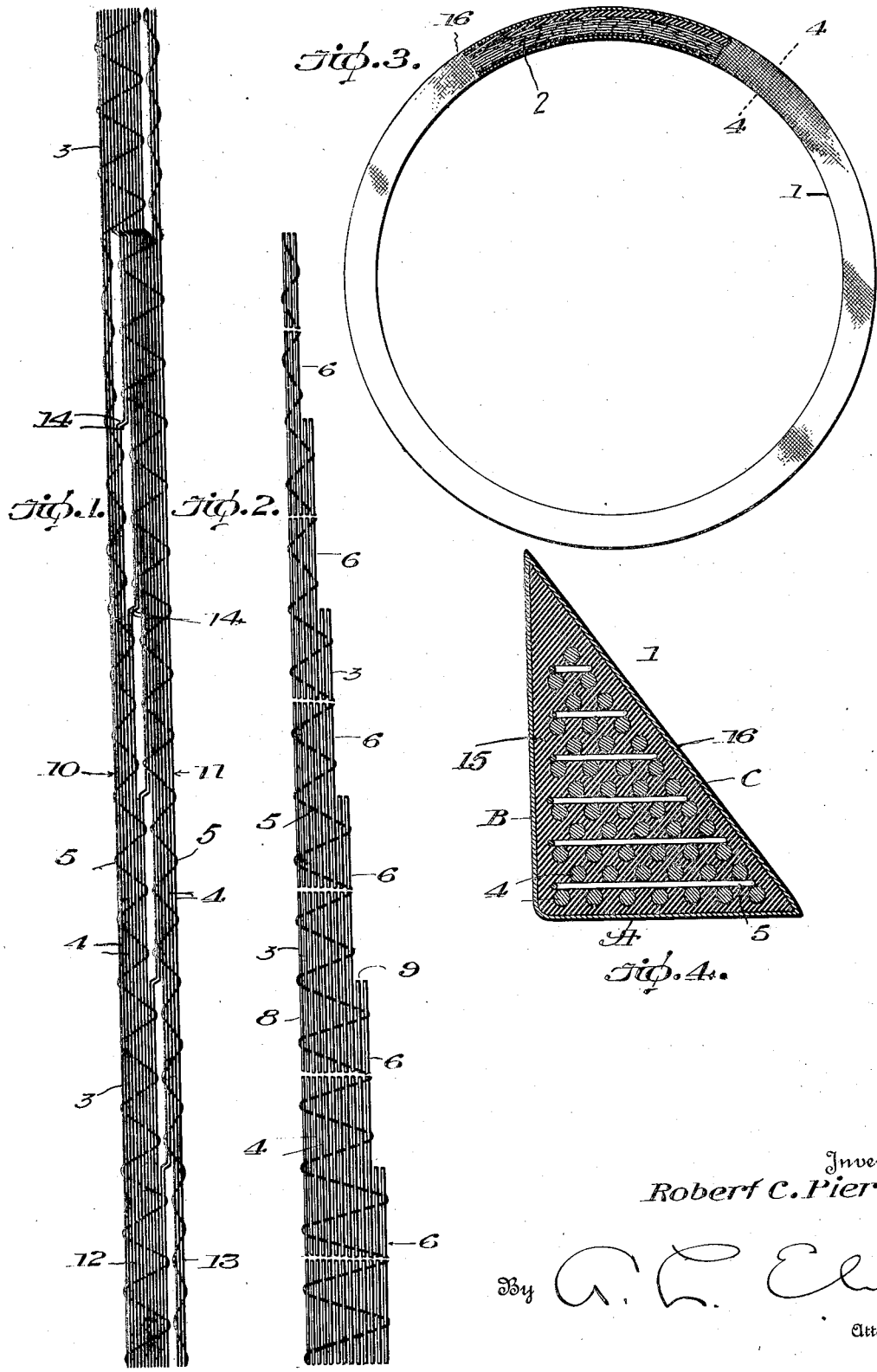

1,665,070

UNITED STATES PATENT OFFICE.

ROBERT C. PIERCE, OF BELLEVILLE, NEW JERSEY, ASSIGNOR, BY MESNE ASSIGNMENTS, TO AMERICAN CHAIN COMPANY, INC., A CORPORATION OF NEW YORK.

TIRE BEAD.

Application filed February 19, 1923. Serial No. 619,838.

My invention relates to improvements in inextensible reinforcements for beads, such as are used in straight-side pneumatic tires.

The broad purpose of my invention is to provide a woven inextensible reinforcement that will extend into all the angles of a tire bead, such as the substantially right-angled triangular bead used in the manufacture of straight-side tires, so that all parts of the bead are inextensible and uniformly reinforced.

A specific purpose of my invention is to provide an annular reinforcement for straight-side beads that may be formed from a single strip of woven wire tape adapted to be wound convolutely into the form of an annulus to produce a reinforcement having the cross-sectional form of a right-angled triangle, which is especially adaptable for use in the preparation of tire beads of the type described.

The foregoing together with other objects and advantages may be obtained through the practice set forth in detail in the following description and illustrated in the accompanying drawings.

In the drawings:

Fig. 1 is a diagrammatic view illustrating my method of weaving two lengths of my wire tape side by side and from a plurality of parallel warp wires;

Fig. 2 is a plan view, partly broken away, of one of the lengths of tape obtained through the practice of my method;

Fig. 3 is an elevational view, partly in section, showing a bead for straight-side tires with my reinforcement incorporated therein; and Fig. 4 is an enlarged transverse sectional view taken on the line 4—4 of Fig. 3.

In the drawings, the numeral 1 designates a straight-side bead ring of standard form, that is to say it is substantially a right-angled triangle in cross-section, and 2 shows my annular wire reinforcement incorporated therein.

It will be noted that the reinforcement is constructed from a single strip of woven wire and conforms in cross-section to the shape of the bead ring 1. It comprises a horizontal base A, a vertical side B, and an oblique side C, so that when it is incorporated in the bead ring it projects into each angle thereof.

Heretofore it has been impossible to construct such a reinforcement of woven wire, so far as I am aware, because it has been impractical to form a triangular structure from such material. My invention affords a simple and practical solution of this problem through the following practice.

I construct a continuous flat tape 3 of woven warp wires 4 and a weft wire 5, and step off or offset one edge of the strip at intervals to provide successively narrower lengths 6 in the strip corresponding in number to the number of convolutions desired in the reinforcement. I obtain this stepped formation of one edge of the tape by dropping off one or more warp wires 4 at intervals during the weaving operation and at one side of the strip. This procedure leaves a straight edge 8 upon one side of the strip and a notched edge 9 at the other side. The widest portion of each unit comprises the greatest number of warp wires 4 and forms the base of the reinforcement. The number of wires in this length is determined by the width of the base A of the bead ring 1 and also the gage of the wires 4. The tape thus produced is wound convolutely with its straight edge 8 forming the vertical side B of the reinforcement to provide a series of superposed layers 10.

From the widest of the lengths 6, warp wires 4 are dropped from each succeeding length to obtain the proper inclination of the oblique side C of the reinforcement. The number of warp wires 4 dropped from each succeeding length is, of course, determined by the height to which it is desired to build the reinforcement and this is determined by the character of the bead ring which frequently varies in height in different types and sizes of tires. In the drawings two warp wires 4 are dropped from each length, but this is illustrative only. The wires 4 are preferably drawn steel wire and the weft wire 5 is relatively smaller, although wire of other forms and proportions may be utilized. Obviously a lesser number of layers may be utilized than that necessary to complete the triangle if it is desired to merely reinforce the base portion of a bead and an unequal number of wires 4 may be dropped from the lengths 6 to alter the contour of the inside face of the reinforcement, all within the spirit of my invention.

In forming my novel tape or strip 3, I propose to use a method by which two strips of tape may be woven side by side from a common series of warp wires 4. Two weft wires 5 are woven, preferably simultaneously, through these wires 4, as shown in Fig. 1 of the drawing, to produce two strips 10 and 11. The wires 5 are first woven into the wires 4 so that the widest length of one strip 10 and the narrowest length of the other strip 11 are side by side, as shown at 12 and 13 respectively. As succeeding lengths of the strips are woven, the desired number of wires are dropped at intervals by the weft wire 5 of strip 10 and are picked up by the wire 5 of the strip 11 until a narrow and wide length have been woven at the opposite end of the strips 10 and 11. At this point the weft wire 5 of the strip 10 picks up all the wires dropped from said strip, which brings the weaving operation back to the starting point above described. It will be noted that through this method two strips are reversely woven side by side to produce successively narrower lengths in one strip and successively wider lengths in the other, and the weaving of both strips is accomplished simultaneously with the same series of warp wires. At the intervals where the wires 4 are dropped from one strip and woven into the other, they are preferably crimped laterally, as at 14, to space the strips 10 and 11 from each other so that they may be readily cut apart. The wire reinforcement may be incorporated in a mass of rubber 15, which is usually semi-cured in finished form and covered with a layer of fabric 16.

Obviously, changes in the construction of the reinforcement are within the spirit of the invention, and the present disclosure is intended to comprehend all changes and modifications within the scope of the appended claims.

The method disclosed herein is claimed in my application Serial No. 75,536, filed Dec. 15, 1925, as a division of this application.

What I claim is:

1. An annular reinforcement for tire bead rings, comprising superposed layers of woven wire tape decreasing in width outwardly of the base of the bead.

2. An annular reinforcement for tire bead rings, comprising superposed layers of woven wire tape, each layer being of different width.

3. An annular reinforcement for tire bead rings, comprising superposed layers of woven wire tape, the layers decreasing successively in width.

4. A reinforcement for tire beads, comprising an annulus of triangular form in cross-section constructed of convolutions of woven wire tape.

5. A reinforcement for tire beads, comprising an annulus of triangular form in cross-section constructed of superposed layers of woven wire tape, the layers being of successively decreasing width.

6. A reinforcement for tire beads, comprising an annulus forming in cross-section a right-angled triangle and constructed of woven wire tape in layers of successively decreasing width.

7. A reinforcement for tire beads, comprising an annulus forming in cross-section a right-angled triangle and constructed throughout of layers of woven wire tape.

8. A reinforcement for tire beads, comprising an annulus of triangular form in cross-section constructed from a continuous strip of woven inextensible tape wound into a series of layers.

9. A reinforcement for tire bead rings, comprising an annulus of triangular form in cross-section formed from a continuous strip of flat wire tape.

10. A reinforcement for tire bead rings, comprising an annulus of triangular form in cross-section formed from a continuous strip of flat wire tape wound into a series of superposed layers.

11. A reinforcement for tire bead rings, comprising an annulus having in cross-section the form of a right-angled triangle and constructed from a continuous strip of flat wire tape wound into a series of layers.

12. A reinforcement for tire bead rings, comprising an annulus of triangular form in cross-section formed from a continuous strip of woven wire tape wound into a series of layers.

13. A reinforcement for tire bead rings, comprising an annulus formed from a continuous strip of woven wire tape adapted to be wound in superposed layers to shape the annulus in cross-section into the form of a triangle.

14. A reinforcement for tire bead rings, comprising an annulus formed from a continuous strip of woven inextensible tape adapted to be wound into a series of layers to shape the annulus in cross-section into the form of a right-angled triangle.

15. As an article of manufacture, a woven inextensible tape for use in reinforcing tire beads and comprising a series of lengths of different widths decreasing progressively from the base of the bead.

16. As an article of manufacture, a woven wire tape for use in reinforcing tire beads and comprising a series of lengths decreasing in width by regular steps toward the apex of the bead.

17. As an article of manufacture, a woven wire tape adapted to be convolutely wound to form an annulus, said tape comprising a series of lengths corresponding to the number of convolutions into which it is to be wound, each length being of different width.

18. As an article of manufacture, a woven wire tape for use in reinforcing tire beads comprising a series of lengths of different widths and having a straight edge at one side of the tape.

19. As an article of manufacture, a woven wire tape having parallel warp wires and comprising a series of lengths, each length embodying a different number of warp wires.

20. As an article of manufacture, a woven wire tape having parallel warp wires and comprising a series of lengths, each succeeding length embodying a smaller number of warp wires.

21. As an article of manufacture, a woven wire tape having parallel warp wires and comprising a series of lengths, each length having a different number of warp wires therein to successively decrease the width of the lengths toward one end of the strip.

22. As an article of manufacture, a woven wire tape having parallel warp threads, said tape having a straight edge and a notched edge to form a series of lengths of relatively different widths.

ROBERT C. PIERCE.